No. 873,337. PATENTED DEC. 10, 1907.
D. APSTEIN.
PUNCTURE CLOSER.
APPLICATION FILED FEB. 14, 1907.

WITNESSES
H. A. Lamb.
S. W. Atherton.

INVENTOR
David Apstein
BY
A. M. Wooster
ATTORNEY

UNITED STATES PATENT OFFICE.

DAVID APSTEIN, OF BRIDGEPORT, CONNECTICUT.

PUNCTURE-CLOSER.

No. 873,337.　　　Specification of Letters Patent.　　　Patented Dec. 10, 1907.

Application filed February 14, 1907. Serial No. 357,300.

*To all whom it may concern:*

Be it known that I, DAVID APSTEIN, a citizen of the United States, residing at Bridgeport, county of Fairfield, State of Connecticut, have invented a new and useful Puncture-Closer, of which the following is a specification.

This invention has for its object to provide a simple, easily and quickly operated and inexpensive puncture closer for pneumatic tires.

With this end in view the invention consists essentially in a flexible closer rotatable upon a threaded shank and adapted to be secured in place after insertion by a nut upon the shank.

The invention consists furthermore in special details of construction which will be hereinafter described and then specifically pointed out in the claims hereunto appended.

Figure 1:
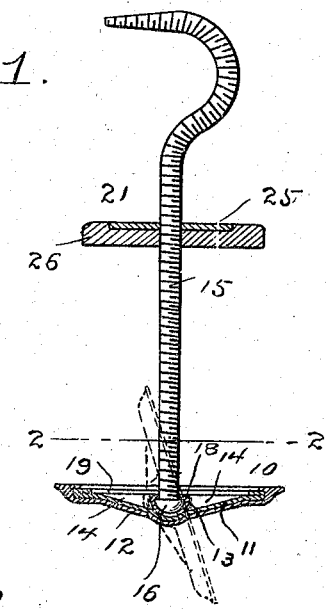
Figure 7:
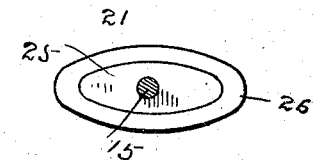
Figure 2:
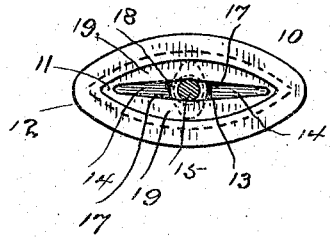
Figure 3:
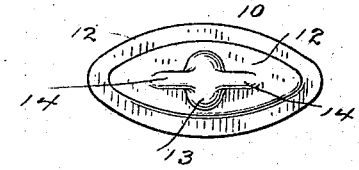
Figures 4, 5, 6:
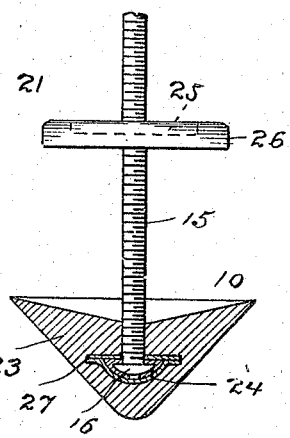

In the accompanying drawing forming a part of this specification, Figure 1 is a view on an enlarged scale, partly in elevation and partly in section, showing a hinged closer in full lines in its operative or closing position and in dotted lines in its inserting position; Fig. 2 a section of the shank on the line 2—2 in Fig. 1 looking down; Fig. 3 an inverted plan view of the closer; Fig. 4 an inverted plan view of the shank and head detached; Fig. 5 an elevation of the shank with the head in section; Fig. 6 a view illustrating a variant form in which a hingeless flexible closer is rotatably attached to a threaded shank; and Fig. 7 is a section of the shank showing the nut in plan.

In the form illustrated in Figs. 1 to 4 inclusive the closer is hinged to the shank in such a manner as to permit the closer to swing in the vertical plane, in addition to which the shank may be rotated in the horizontal plane independently of the closer.

10 denotes the closer proper. This closer comprises a body 11, which is blanked out and formed from sheet metal, and a pad 12 of rubber into which the body is molded. The general shape of the body in plan is an elongated oval narrowed at the ends. At the center of the body I form a transverse socket 13, and on opposite sides of the socket I form central longitudinal grooves 14, deepest at their inner ends, which extend from the socket and run out toward the ends of the body.

15 denotes the shank which is threaded and is provided with a rounded head 16, upset thereon, and 21 a nut upon the shank, preferably elongated to correspond in shape with the body of the closer and padded. The edge of the blank from which the body is formed is curved over inward, leaving, however, a longitudinal slot 17 in the upper side thereof which receives the shank when the closer is swung to the inserting position, as will be more fully explained. 18 denotes an elongated cap formed from sheet metal which incloses the head of the shank. This cap is made to just fit in transverse socket 13, the socket and cap being so shaped as to leave the cap free to oscillate in the socket but to retain it against other movement. The sides of the top of the body, which I have specifically indicated by 19, are closed over the ends of the cap as clearly shown in Fig. 2, thereby securely retaining it in place but leaving it free to be oscillated from side to side. The cap is formed from a blank of sheet metal having a hole 20 at the center through which the shank passes loosely. The edge of the blank is then closed over the head of the shank to form the cap, as will be clearly understood from Figs. 4 and 5. The cap fits the head closely so as to have no movement thereon other than rotary movement of the shank and cap independently.

It will be noted in Fig. 1 that the edge of the pad is made relatively thin so as to be perfectly flexible, and that it extends outward from the body all around. This is in order to insure a perfectly close fit when the closer is drawn tightly against the inner wall of the tire and the tire is clamped between the closer and the nut. In manufacturing the bodies, the sides of the top are not closed down as shown in the drawing, but are left raised and longitudinal slot 17 is left open sufficiently to permit the cap to be passed through the slot and then turned and placed in the socket after which the sides of the body are closed down upon the cap so as to retain it securely in place but leave it free to oscillate from side to side, as in Fig. 1. This oscillation of the body upon the shank is for the purpose of convenience in insertion. In the inserting position, the closer is swung almost into alinement with the shank, the shank in the inserting position lying in slot 17 and in one of the longitudinal grooves 14, either of said grooves being adapted to receive it, as indicated by dotted lines in Fig. 1. The nut 21 may be of any suitable character. I preferably, however, use a padded nut, for example, of the character illustrated in Fig. 6, in which the nut is shown as comprising a metal plate, indicated by 25, the operative face and edge of which are molded into a block of rubber, indicated by 26. By using a padded nut with the flexible closer wear upon the outer face of a tire is prevented, and, the walls of the tire being gripped between two correspondingly shaped flexible surfaces, the possibility of leakage is prevented.

In use, the puncture to be closed is enlarged if necessary sufficiently to permit the closer to be forced through when swung to the inserting position, as in dotted lines in Fig. 1. When inserting the closer, the edges of the pad at the sides may be folded over the top of the body so that the closer may be forced through a relatively small opening. Having first turned the nut back on the shank and then passed the closer through the puncture, the shank is drawn outward. The highest end of the closer will engage the inner wall of the tire, and as the shank is drawn outward the closer will assume the closing position, that is, at right angles to the shank, as in full lines in Fig. 1. The nut is then turned down on the shank until it engages the outer face of the tire, after which the nut is held and the shank is rotated, the head turning in the cap, and the closer upon the inner side of the tire remaining stationary until the walls of the tire are tightly gripped between the nut and the closer. The outer end of the shank may be curved and re-curved, as shown in the drawing, to form a hand piece for convenience in manipulation. After the nut has been set to place, the shank is broken or cut off flush with the outer surface of the nut.

In the form illustrated in Fig. 6, instead of a hinged closer as in the other form, I use a closer consisting of a solid block of rubber indicated by 23 suitably shaped to permit it to be forced through a puncture. In this form the cap, which is specifically indicated by 24, may be round or elongated as preferred. It is formed loosely upon head 15 as before, patches 27 of flexible material being placed on opposite sides thereof and cemented thereto and the head and patches are molded into the closer.

Having thus described my inventio, In claim:

1. A device of the character described comprising a threaded shank having a head formed thereon, a sheet metal cap formed from a disk of metal having a central hole through which the shank is passed, the disk being then closed loosely over the head and a flexible closer secured to the cap.

2. A device of the character described comprising a threaded shank having a head formed thereon, a sheet metal cap formed from a disk of metal having a central hole through which the shank is passed, the disk being then closed loosely over the head, and a flexible closer secured to the cap.

3. A device of the character described comprising a threaded shank having a head formed thereon, an elongated sheet metal cap formed upon the head in which the shank and head are rotatable, and a flexible closer consisting of a sheet metal body having a socket to receive the cap, on which the body swings in the vertical plane, and a flexible pad into which the body is molded.

4. A device of the character described comprising a threaded shank having a head formed thereon, an elongated sheet metal cap formed upon the head in which the shank and head are rotatable and a flexible closer consisting of a sheet metal body having a transverse socket to receive the cap, grooves leading therefrom deepest at the inner end and a longitudinal slot in the upper side thereof, said slot and said groove being adapted to receive the shank in the inserting position, and a flexible pad into which the body is molded.

5. In a device of the character described, the combination with a threaded shank having a head formed thereon and an elongated cap swiveled on the head, of an elongated flexible closer consisting of a sheet metal body and a pad of rubber in which the body is molded, said body being provided with a transverse socket to receive the cap, longitudinal grooves leading from the socket and deepest at the inner end and a slot in the upper side thereof, said slot and grooves being adapted to receive the shank in the inserting position.

6. In a device of the character described, the combination with a threaded shank having a head formed thereon, of an elongated flexible closer hinged and swiveled to the head and an elongated nut on the shank.

In testimony whereof I affix my signature, in presence of two witnesses.

DAVID APSTEIN.

Witnesses:
A. M. WOOSTER,
S. W. ATHERTON.